United States Patent
Ikarashi et al.

(10) Patent No.: US 10,665,137 B2
(45) Date of Patent: May 26, 2020

(54) INCONSISTENCY DETECTING METHOD, INCONSISTENCY DETECTING SYSTEM, INCONSISTENCY DETECTING DEVICE, AND PROGRAM

(71) Applicant: NIPPON TELEGRAPH AND TELEPHONE CORPORATION, Chiyoda-ku (JP)

(72) Inventors: Dai Ikarashi, Musashino (JP); Ryo Kikuchi, Musashino (JP); Koki Hamada, Musashino (JP); Koji Chida, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 176 days.

(21) Appl. No.: 15/541,410

(22) PCT Filed: Feb. 1, 2016

(86) PCT No.: PCT/JP2016/052946
§ 371 (c)(1),
(2) Date: Jul. 3, 2017

(87) PCT Pub. No.: WO2016/125749
PCT Pub. Date: Aug. 11, 2016

(65) Prior Publication Data
US 2018/0025670 A1    Jan. 25, 2018

(30) Foreign Application Priority Data

Feb. 6, 2015  (JP) ................................ 2015-022189

(51) Int. Cl.
*H04L 29/06* (2006.01)
*G09C 1/00* (2006.01)
(Continued)

(52) U.S. Cl.
CPC ............... *G09C 1/00* (2013.01); *G06F 21/64* (2013.01); *H04L 9/085* (2013.01)

(58) Field of Classification Search
CPC ............ G09C 1/00; H04L 9/085; G06F 21/64
(Continued)

(56) References Cited

U.S. PATENT DOCUMENTS

2006/0177061 A1* 8/2006 Orsini .................. G06F 21/606
380/268
2009/0327818 A1   12/2009 Kogelnik
(Continued)

OTHER PUBLICATIONS

Hamada K., Kikuchi R., Ikarashi D., Chida K., Takahashi K. Practically Efficient Multiparty Sorting Protocols from Comparison Sort Algorithms. In: Kwon T., Lee MK., Kwon D. (eds) Information Security and Cryptology—ICISC 2012. ICISC 2012. Lecture Notes in Computer Science, vol. 7839. pp. 202-216. (Year: 2013).*
(Continued)

*Primary Examiner* — Shewaye Gelagay
*Assistant Examiner* — Kevin Ayala
(74) *Attorney, Agent, or Firm* — Oblon, McClelland, Maier & Neustadt, L.L.P.

(57) ABSTRACT

An inconsistency in shares is detected with a small volume of communications traffic. n inconsistency detecting devices generate random numbers $s_i$ and make the random numbers $s_i$ public. The n inconsistency detecting devices generate a common random number s which is the sum total of the random numbers $s_0, \ldots, s_{n-1}$. The n inconsistency detecting devices calculate shares $[c]_i$. The n inconsistency detecting devices generate shares $[r]_i$, each of which would become a random number r by reconstruction. The n inconsistency detecting devices calculate shares $[d]_i$, each of which would become a judgment value d by reconstruction. One inconsistency detecting device receives shares $[d]_1, \ldots, [d]_{n-1}$ from n−1 inconsistency detecting devices. The one incon-
(Continued)

sistency detecting device restores n−k shares $[d]'_k, \ldots, [d]'_{n-1}$ from k shares $[d]_0, \ldots, [d]_{k-1}$. The one inconsistency detecting device judges, for j=k, . . . , n−1, whether or not a share $[d]_j$ and a share $[d]'_j$ coincide with each other.

5 Claims, 3 Drawing Sheets

(51) Int. Cl.
*G06F 21/64* (2013.01)
*H04L 9/08* (2006.01)

(58) Field of Classification Search
USPC .......................................................... 380/28
See application file for complete search history.

(56) References Cited

U.S. PATENT DOCUMENTS

| | | | |
|---|---|---|---|
| 2011/0126291 A1* | 5/2011 | Araki | H04L 9/085 726/26 |
| 2012/0243679 A1* | 9/2012 | Obana | G06F 21/6209 380/28 |
| 2012/0246490 A1* | 9/2012 | Unagami | G06F 21/55 713/193 |
| 2012/0254619 A1 | 10/2012 | Dhuse et al. | |
| 2012/0254687 A1 | 10/2012 | Leggette et al. | |
| 2012/0254688 A1 | 10/2012 | Resch | |
| 2012/0254689 A1 | 10/2012 | Resch | |
| 2014/0122891 A1 | 5/2014 | Dhuse et al. | |
| 2015/0046769 A1 | 2/2015 | Leggette et al. | |
| 2015/0113115 A1 | 4/2015 | Resch | |

OTHER PUBLICATIONS

Kikuchi R., Chida K., Ikarashi D., Hamada K., Takahashi K.Secret Sharing Schemes with Conversion Protocol to Achieve Short Share-Size and Extendibility to Multiparty Computation. In: Boyd C., Simpson L. (eds) Information Security and Privacy. ACISP 2013. Lecture Notes in Computer Science, vol. 7959. pp. 419-434.*
Tiina Turban, A Secure Multi-Party Computation Protocol Suite Inspired by Shamir's Secret Sharing Scheme, Norwegian University of Science and Technology Department of Telematics, pp. 47-52. (Year: 2014).*
Paul Feldman, A Practical Scheme for Non-interactive Verifiable Secret Sharing, Massachusetts Institute of Technology, pp. 427-437 (Year: 1987).*
International Search Report dated Apr. 26, 2016 in PCT/JP2016/052946 filed Feb. 1, 2016.
Fitzi, Matthias et al., "Round-Optimal and Efficient Verifiable Secret Sharing," TCC 2006, vol. 3876 of Lecture Notes in Computer Science, 2006, 14 pages.
Shamir, Adi, "How to Share a Secret," Communications of the ACM, vol. 22 (11), 1979, pp. 612-613.
Cramer, Ronald et al., "Share Conversion, Pseudorandom Secret-Sharing and Applications to Secure Computation," TCC 2005, vol. 3378 of Lecture Notes in Computer Science, 2005, pp. 342-362.
Extended European Search Report dated Jun. 26, 2018 in Patent Application No. 16746580.6, 7 pages.
Feldman, P. "A Practical Scheme for Non-interactive Verifiable Secret Sharing", Proceedings of the 28th Annual Symposium on Foundations of Computer Science, IEEE, XP031288103. 1987, pp. 427-437.

* cited by examiner

INCONSISTENCY DETECTING METHOD, INCONSISTENCY DETECTING SYSTEM, INCONSISTENCY DETECTING DEVICE, AND PROGRAM

TECHNICAL FIELD

This invention relates to a secret sharing technology and, in particular, relates to a technology of detecting an inconsistency in shares obtained by secret sharing.

BACKGROUND ART

Secret sharing is a technology that converts data into a distributed value obtained by dividing the data into a plurality of values and allows the original data to be reconstructed by using a given number of shares or more and does not allow the original data to be reconstructed from less than the given number of shares. Incidentally, a group of a plurality of values obtained by secret sharing is referred to as a distributed value and one fragment of the distributed value is referred to as a share.

If there is an inconsistency in shares held by calculation entities (hereinafter also referred to as parties), a problem of different reconstruction results depending on how a share is selected at the time of reconstruction arises. Thus, it is necessary to check whether or not there is an inconsistency in shares when the original data is reconstructed from the distributed value. Non-patent Literature 1 describes a technique of detecting an inconsistency in shares without passing a share to another calculation entity.

PRIOR ART LITERATURE

Non-Patent Literature

Non-patent Literature 1: M. Fitzi, J. A. Garay, S. Gollakota, C. P. Rangan, and K. Srinathan, "Round-optimal and efficient verifiable secret sharing", TCC 2006, Vol. 3876 of Lecture Notes in Computer Science, pp. 329-342, 2006.

SUMMARY OF THE INVENTION

Problems to be Solved by the Invention

A principal object of the existing technique described in Non-patent Literature 1 is to make the number of communications stages more efficient. However, in handling large data, it is more effective to reduce the volume of communications traffic than to reduce the number of communications stages.

In view of the above point, an object of this invention is to reduce the volume of communications traffic in a secret sharing technology that can detect an inconsistency in shares.

Means to Solve the Problems

In order to solve the above-described problem, in an inconsistency detecting method of this invention, n and k are assumed to be integers that satisfy $n \geq 2k-1$, m is assumed to be an integer greater than or equal to 1, i is assumed to be each of integers greater than or equal to 0 but smaller than n, and n inconsistency detecting devices $p_i$ store shares $[a_0]_i, \ldots, [a_{m-1}]_i$ obtained by dividing m values $a_0, \ldots a_{m-1}$ by (k, n)-secret sharing, and the inconsistency detecting method includes: a public random number generating step in which the n inconsistency detecting devices $p_i$ generate random numbers $s_i$ and make the random numbers $s_i$ public; a common random number calculation step in which the n inconsistency detecting devices $p_i$ generate a common random number s which is the sum total of the random numbers $s_0, \ldots, s_{n-1}$; a checksum calculation step in which the n inconsistency detecting devices $p_i$ calculate shares $[c]_i = \Sigma_{j<m-1} s^{j+1}[a_j]_i + s^{m+1}[a_{m-1}]_i$ by using the common random number s and the shares $[a_0]_i, \ldots, [a_{m-1}]_i$; a random number distributed value generating step in which the n inconsistency detecting devices $p_i$ generate shares $[r]_i$, each of which would become a random number r by reconstruction; a judgment value calculation step in which the n inconsistency detecting devices $p_i$ calculate shares $[d]_i = [c-r]_i$, each of which would become a judgment value d by reconstruction; a judgment value communication step in which one inconsistency detecting device $p_0$ receives n-1 shares $[d]_1, \ldots, [d]_{n-1}$ from n-1 inconsistency detecting devices $p_1, \ldots, p_{n-1}$; a judgment value restoration step in which the inconsistency detecting device $p_0$ restores n-k shares $[d]'_k, \ldots, [d]'_{n-1}$ from k shares $[d]_0, \ldots, [d]_{k-1}$; and an inconsistency judging step in which the inconsistency detecting device $p_0$ judges, for $j=k, \ldots n-1$, whether or not the share $[d]_j$ and the share $[d]'_j$ coincide with each other.

Effects of the Invention

With the inconsistency detection technology of this invention, it is possible to detect an inconsistency in shares with a small volume of communications traffic.

DETAILED DESCRIPTION OF THE EMBODIMENTS

Figure 1:
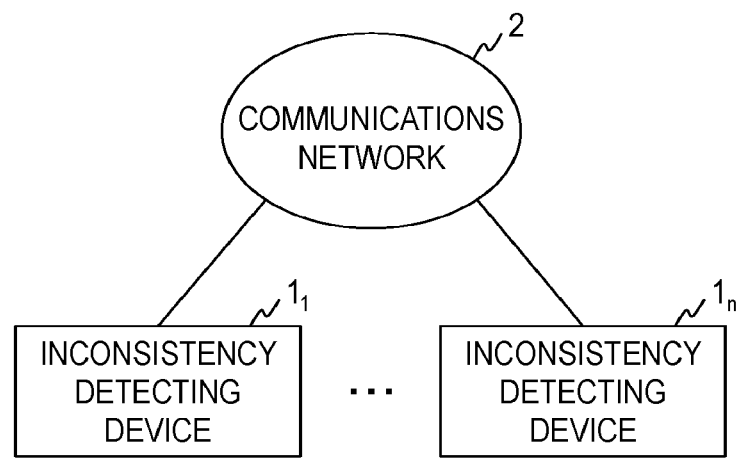
FIG. 1 is a diagram illustrating the functional configuration of an inconsistency detecting system.

Prior to description of embodiments, a notation method and terms which are used in the following description will be explained.

[Notation Method]

$p_i$ represents a party that holds an i-th share.

$P=(p_0, \ldots, p_{n-1})$ represents a set of the whole of n parties that hold shares.

[x] (square brackets) represents a (k, n)-secret shared value of plain text x. The (k, n)-secret shared value is a group of all values obtained by distributing the plain text x by (k, n)-secret sharing. All of the above values are not held in a single site because the (k, n)-secret shared value [x] is usually distributed and held by n-party set P, and the (k, n)-secret shared value [x] is virtual.

$[x]_i$ represents a share, which is held by a party $p_i \in P$, of the (k, n)-secret shared value [x].

q is a prime number.

F is a set of numbers mod q.

|F| is the number of bits necessary to indicate an element of F.

[Secret Sharing]

A secret shared value to be subjected to inconsistency detection in this invention is a distributed value obtained by arbitrary (k, n)-secret sharing. (k, n)-secret sharing, which is a kind of secret sharing, is secret sharing that distributes, to n parties, a distributed value obtained by dividing input plain text into n shares and holds the distributed value in the n parties and allows the plain text to be reconstructed if arbitrary k shares are complete and does not allow any information on the plain text to be obtained from less than k shares. In this case, n and k are integers greater than or equal to 1 and n≥2k−1 holds. Examples of (k, n)-secret sharing include Shamir's secret sharing described in Reference Literature 1 below and replicated secret sharing described in Reference Literature 2 below.

[Reference Literature 1] A. Shamir, "How to share a secret", Communications of the ACM, vol. 22(11), pp. 612-613, 1979.

[Reference Literature 2] R. Cramer, I. Damgard, and Y. Ishai, "Share conversion, pseudorandom secret-sharing and applications to secure computation", TCC 2005, Vol. 3378 of Lecture Notes in Computer Science, pp. 342-362, 2005.

In Shamir's secret sharing, a coordinate $x_i$ is allocated to an i-th party $p_i$ and plain text a is distributed by the following formula by using a random number $r_i$.

$$[a]_i = a + \sum_{1 \leq i \leq k-1} r_i x^i$$

If n=3 and k=2 hold, for example, replicated secret sharing transforms plain text a to a:=$a_0$+$a_1$+$a_2$ and distributes it to three shares: $[a_0, a_1]_0$, $[a_1, a_2]_1$, and $[a_2, a_0]_2$. The elements $a_0$, $a_1$, and $a_2$ that make up the shares are called subshares.

[Restoration]

Restoration is a method by which, on the condition that at least k shares are usable when some shares are lost because, for example, a calculation entity holding the share becomes unusable, the shares that became unusable are reconstructed from the usable k shares without loss of concealment.

In Shamir's secret sharing, it is possible to restore, from usable k shares, the other n-k shares by publicly known Lagrange's interpolation.

In replicated secret sharing, by combining subshares included in usable k shares, it is possible to restore the other n-k shares. For instance, in the above-described example of replicated secret sharing, if a party $p_2$ (that is, the share $[a_2, a_0]_2$) becomes unusable, by combining the subshare $a_0$ held by a party $p_0$ and the subshare $a_2$ held by a party $p_1$, it is possible to restore the lost share $[a_2, a_0]_2$.

[Reconstruction]

Reconstruction is a method by which k shares of n shares are collected and the original plain text is obtained from the k shares. In Shamir's secret sharing, it is possible to reconstruct the original plain text from k shares by publicly known Lagrange's interpolation. In replicated secret sharing, by adding up different subshares included in k shares, it is possible to reconstruct the original plain text.

Hereinafter, embodiments of this invention will be described in detail. It is to be noted that constitutional units having the same function in the drawings will be identified with the same reference numeral and overlapping explanations will be omitted.

First Embodiment

Inconsistency detecting system and method of a first embodiment simultaneously detect an inconsistency in a plurality of shares subjected to secret sharing. In the present embodiment, it is possible to detect the presence or absence of an inconsistency, but it is impossible to detect a share in which an inconsistency has occurred. In a situation in which the system and method are used in regular inconsistency detection, since it is considered that, in most cases, no inconsistency occurs under normal conditions, the system and method are sufficiently effective if the system and method can detect the presence or absence of an inconsistency as a whole.

With reference to FIG. 1, a configuration example of the inconsistency detecting system of the embodiment will be described. The inconsistency detecting system includes n (≥3) inconsistency detecting devices $1_1, \ldots, 1_n$. In the present embodiment, the inconsistency detecting devices $1_1, \ldots, 1_n$ are connected to a communications network 2. The communications network 2 is a circuit switching or packet switching communications network that is configured such that the devices connected thereto can communicate with one another, and, for example, the Internet, a local area network (LAN), a wide area network (WAN), and so forth can be used. Incidentally, the devices do not necessarily have to be capable of communicating with one another online via the communications network 2. For example, a configuration may be adopted in which information that is input to the inconsistency detecting devices $1_1, \ldots 1_n$ is stored in a portable recording medium such as a magnetic tape or a USB memory and is input to the inconsistency detecting devices $1_1, \ldots 1_n$ from the portable recording medium offline.

Figure 2:
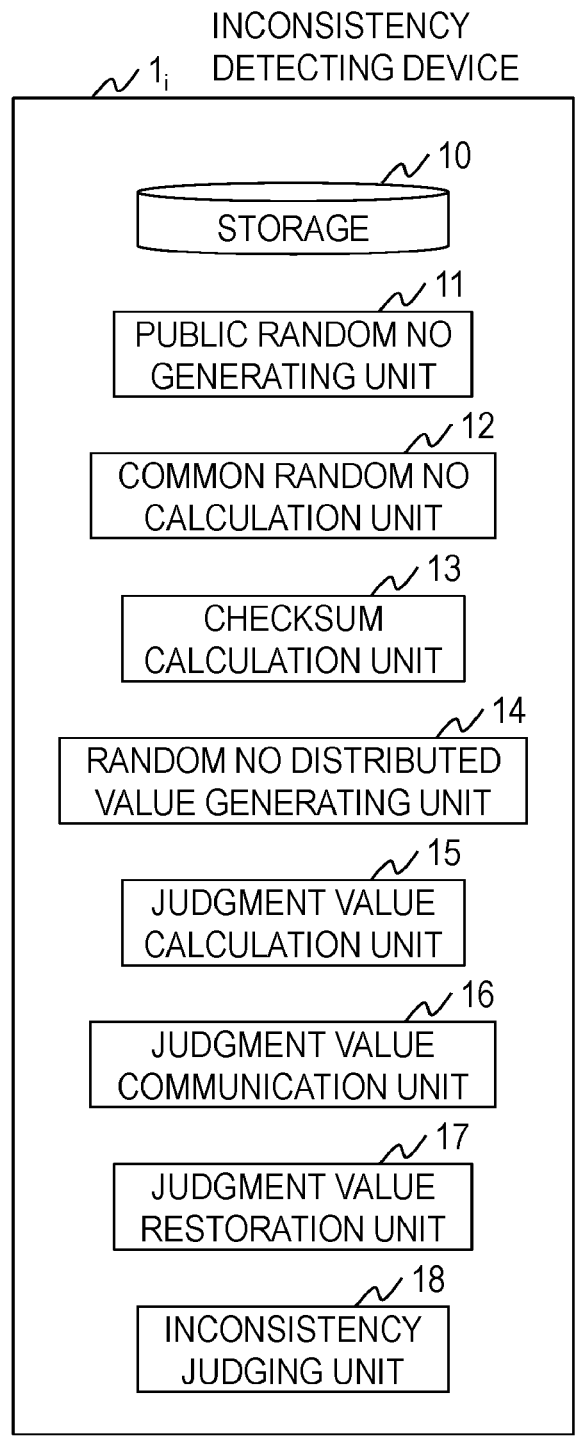
FIG. 2 is a diagram illustrating the functional configuration of an inconsistency detecting device.

With reference to FIG. 2, a configuration example of an inconsistency detecting device $1_i$ (i=1, ..., n) included in the inconsistency detecting system will be described. The inconsistency detecting device $1_i$ includes, for example, a storage 10, a public random number generating unit 11, a common random number calculation unit 12, a checksum calculation unit 13, a random number distributed value generating unit 14, a judgment value calculation unit 15, a judgment value communication unit 16, a judgment value restoration unit 17, and an inconsistency judging unit 18.

The inconsistency detecting device is a special device configured as a result of a special program being read into a publicly known or dedicated computer including, for example, a central processing unit (CPU), a main storage device (random access memory: RAM), and so forth. The inconsistency detecting device $1_i$ executes each processing under control of the central processing unit, for example. The data input to the inconsistency detecting device $1_i$ and the data obtained by each processing are stored in a memory, for example, and the data stored in the memory is read into the central processing unit when necessary and used for another processing. At least part of each processing unit of the inconsistency detecting device $1_i$ may be configured by using hardware such as an integrated circuit.

Figure 3:
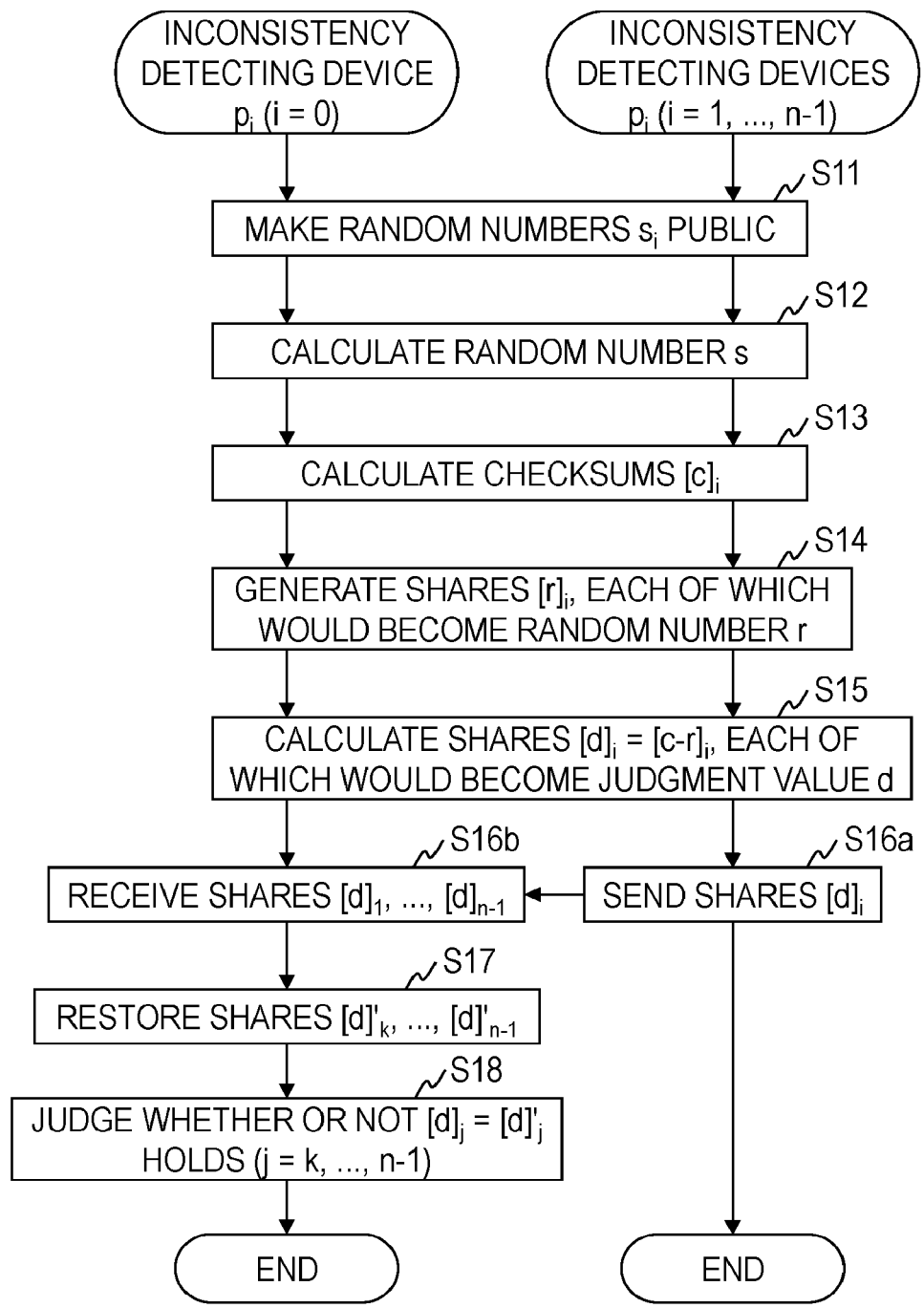
FIG. 3 is a diagram illustrating a processing flow of an inconsistency detecting method.

With reference to FIG. 3, a processing procedure of the inconsistency detecting method of the embodiment will be described.

Hereinafter, assume that $p_0, \ldots, p_{n-1}$ represent n inconsistency detecting devices that hold distributed n shares and $p_0$ represents an inconsistency detecting device that outputs the detection result indicating whether or not there is an inconsistency in the n shares. $p_0, \ldots, p_{n-1}$ are each a character logically indicating the role of the inconsistency detecting device, and a correspondence between the inconsistency detecting devices $1_1, \ldots, 1_n$ and the inconsistency detecting devices $p_0, \ldots, p_{n-1}$ is arbitrarily determined at the time of execution. In the following description, a processing procedure in which one inconsistency detecting device $p_0$ detects an inconsistency will be described, but a configuration is also possible in which n inconsistency detecting devices $p_0, \ldots p_{n-1}$ concurrently perform similar processing while changing the roles thereof with one another and arbitrary multiple inconsistency detecting devices individually output the detection results.

In the storages 10 of the n inconsistency detecting devices $p_i$ (i=0, . . . , n−1), shares $[a_0]_i, \ldots, [a_{m-1}]_i$ are stored. The shares $[a_0]_i, \ldots, [a_{m-1}]_i$ are shares obtained by distributing m (≥1) values $a_0, \ldots a_{m-1}$ by (k, n)-secret sharing. As the (k, n)-secret sharing of the present embodiment, any arbitrary secret sharing can be used as long as the secret sharing is secret sharing of such a type that can perform restoration and reconstruction from k shares by linear combination.

In Step S11, the public random number generating units 11 of the n inconsistency detecting devices $p_i$ generate random numbers $s_i$. The public random number generating units 11 make the generated random numbers $s_i$ public so that the other n−1 inconsistency detecting devices $p_{i'}$ (i'=0, . . . , n−1, i≠i') can refer thereto.

In Step S12, each of the common random number calculation units 12 of the n inconsistency detecting devices $p_i$ calculates a common random number s by the following formula by using a total of n random numbers $s_0, \ldots, s_{n-1}$: the random number $s_i$ generated thereby and the random numbers $s_{i'}$ which are made public by the other n−1 inconsistency detecting devices $p_{i'}$.

$$s := \Sigma_{i<n} s_i$$

In Step S13, the checksum calculation units 13 of the n inconsistency detecting devices $p_i$ calculate checksums $[c]_i$ by the following formula by using the common random number s calculated by the common random number calculation units 12 and the shares $[a_0]_i, \ldots, [a_{m-1}]_i$ stored in the storages 10.

$$[c]_i := \Sigma_{j<m-1} s^{j+1} [a_j]_i + s^{m+1} [a_{m-1}]_i$$

In Step S14, the random number distributed value generating units 14 of the n inconsistency detecting devices $p_i$ generate shares $[r]_i$, each of which would become a random number r by reconstruction. The generation of the shares $[r]_i$ has to be performed in a state in which the random number r is concealed from any of the inconsistency detecting devices $1_1, \ldots, 1_n$. For instance, a distributed value $[r]$ can be generated in the following manner. First, each inconsistency detecting device $1_i$ generates a random number $r_i$. Next, each inconsistency detecting device $1_i$ generates a distributed value $[r_i]$ of the random number $r_i$ by the (k, n)-secret sharing. Then, each inconsistency detecting device $1_i$ calculates $[r] = \Sigma_{i<n}[r_i]$ and obtains a distributed value $[r]$ of the random number r. With such a configuration, it is possible to obtain the distributed value $[r]$ of the random number r without allowing any of the inconsistency detecting devices $1_1, \ldots, 1_n$ to know the random number r. Moreover, if it is possible to permit prior holding of a common random number or use of a pseudo random number, the distributed value $[r]$ of the random number r can be generated by using replicated secret sharing. The use of replicated secret sharing makes it possible to generate the distributed value $[r]$ of the random number r without communication between the inconsistency detecting devices $1_1, \ldots, 1_n$.

In Step S15, the judgment value calculation units 15 of the n inconsistency detecting devices $p_i$ calculate shares $[d]_i = [c-r]_i$, each of which would become a judgment value d by reconstruction. It is possible to perform subtraction of one share from another share without communication between the inconsistency detecting devices $1_1, \ldots, 1_n$.

In Step S16a, the judgment value communication units 16 of the n−1 inconsistency detecting devices $p_1, \ldots, p_{n-1}$ send the shares $[d]_i$ to the inconsistency detecting device $p_0$. In Step S16b, the judgment value communication unit 16 of the inconsistency detecting device $p_0$ receives n−1 shares $[d]_1, \ldots, [d]_{n-1}$ from the n−1 inconsistency detecting devices $p_1, \ldots, p_{n-1}$.

In Step S17, the judgment value restoration units 17 of the n inconsistency detecting devices $p_i$ restore n−k shares $[d]'_k, \ldots, [d]'_{n-1}$ from k shares $[d]_0, \ldots, [d]_{k-1}$. In the case of Shamir's secret sharing, it is possible to restore, from k shares, the other n−k shares by Lagrange's interpolation. In replicated secret sharing, by combining subshares included in k shares, it is possible to restore the other n−k shares.

In Step S18, for j=k, . . . , n−1, each of the inconsistency judging units 18 of the n inconsistency detecting devices $p_i$ judges whether or not a share $[d]_j$ received from an inconsistency detecting device $p_j$ and a restored share $[d]'_j$ coincide with each other. If $[d]_j = [d]'_j$ holds for all of j=k, . . . , n−1, the inconsistency judging unit 18 judges that there is no inconsistency; if $[d]_j \neq [d]'_j$ for any j, the inconsistency judging unit 18 judges that there is an inconsistency. If the inconsistency judging unit 18 judges that there is no inconsistency, the inconsistency judging unit 18 outputs information to that effect (for example, the judgment value d reconstructed from the k shares $[d]_0, \ldots, [d]_{k-1}$). If the inconsistency judging unit 18 judges that there is an inconsistency, the inconsistency judging unit 18 outputs information to that effect (for example, "⊥").

In the present embodiment, in Step S13, a share of an input is embedded in a coefficient of a polynomial whose variable is a random number. If secret sharing is performed over a field, values $x_0, \ldots, x_{m-1}$ (an algebraic structure which is used in secret sharing is a group and all the values thereof can be expressed by addition) improperly added to a tampered fragment become random numbers such as $s^{i+1} x_i$ by being multiplied by a random number. The probability that the sum of these random numbers becomes 0 by final reconstruction (that is, a failure in detection) is m/|F| at most, and the result can be ignored if |F| is large.

In the inconsistency detecting system and method of the present embodiment, irrespective of the number of fragments, the volume of communications traffic is O(1) and the number of communications stages is O(1) round; therefore, the inconsistency detecting system and method of the present embodiment are very efficient.

Second Embodiment

With the inconsistency detecting system and method of the first embodiment, only the presence or absence of an inconsistency in a plurality of shares as a whole can be detected. However, by repeating the method of the first embodiment, it is possible to identify a share in which an inconsistency has occurred. This is efficient if, in particular, the number of shares in which an inconsistency has occurred is small.

In an inconsistency detecting method of the present embodiment, shares $[a_0], \ldots, [a_{m-1}]$ are divided into two groups (for example, $[a_0], \ldots, [a_{m/2-1}]$ and $[a_{m/2}], \ldots, [a_{m-1}]$) and the presence or absence of an inconsistency in each group is detected by the method of the first embodiment. For a group in which an inconsistency has occurred (assume that an inconsistency has occurred in $[a_0], \ldots, [a_{m/2-1}]$, for example), the group is further divided into two groups (for example, $[a_0], \ldots, [a_{m/4-1}]$ and $[a_{m/4}], \ldots, [a_{m/2-1}]$), and the presence or absence of an inconsistency is detected by the method of the first embodiment. When the number of shares included in the group becomes one as a result of this processing being repeated, it is possible to identify a share in which an inconsistency has occurred.

Since the number of repetitions in the inconsistency detecting system and method of the present embodiment is up to log m, the volume of communications traffic is O(log m) and the number of communications stages is O(log m) round. In particular, when the number of fragments in which an inconsistency has occurred is small, the inconsistency detecting system and method of the present embodiment are efficient because only a small number of repetitions is required.

Third Embodiment

Even with the method of the second embodiment, it is impossible to detect which share of the n shares subjected to secret sharing is improper. However, the methods of the above-described embodiments can be executed if $n=2k-1$ holds when n is the total number of shares and k is the number of shares necessary for reconstruction. Therefore, when $n>2k-1$ holds, $2k-1$ inconsistency detecting devices are selected from among n inconsistency detecting devices and inconsistency detection is repeated by the methods of the above-described embodiments. This makes it possible to detect that a share held by the inconsistency detecting device on which processing has been performed in all the cases of detection of an inconsistency is an improper share.

It goes without saying that this invention is not limited to the above-described embodiments and changes may be made thereto as appropriate without departing from the spirit of this invention. The various kinds of processing described in the above embodiments may be executed, in addition to being executed in chronological order in accordance with the descriptions, in parallel or individually depending on the processing power of a device that executes the processing or when needed.

[Programs, Recording Media]

When the various processing functions of each device described in the above embodiments are implemented by a computer, the processing details of the functions supposed to be provided in each device are described by a program. Then, as a result of this program being executed by the computer, the various processing functions in each device described above are implemented on the computer.

The program describing the processing details can be recorded on a computer-readable recording medium. The computer-readable recording medium may be any computer-readable recording medium such as a magnetic recording device, an optical disk, a magneto-optical recording medium, or semiconductor memory.

Moreover, the distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer reads the program stored in the recording medium thereof and executes the processing in accordance with the read program. Moreover, as another mode of execution of this program, the computer may read the program directly from the portable recording medium and execute the processing in accordance with the program and, furthermore, every time the program is transferred to the computer from the server computer, the computer may sequentially execute the processing in accordance with the received program. In addition, a configuration may be adopted in which the transfer of a program to the computer from the server computer is not performed and the above-described processing is executed by so-called application service provider (ASP)-type service by which the processing functions are implemented only by an instruction for execution thereof and result acquisition. Incidentally, the program in the present embodiment is assumed to include information (data or the like which is not a direct command to the computer but has the property of defining the processing of the computer) which is used for processing by an electronic calculator and is equivalent to a program.

Moreover, in this embodiment, the present device is assumed to be configured as a result of a predetermined program being executed on the computer, but at least part of these processing details may be implemented on the hardware.

What is claimed is:

1. An inconsistency detecting method, implemented by an inconsistency detecting system that includes n inconsistency detecting devices, wherein n and k are assumed to be integers that satisfy $n \geq 2k-1$, m is assumed to be an integer greater than or equal to 1, and i is assumed to be each of integers greater than or equal to 0 but smaller than n, the inconsistency detecting method comprising:

storing shares $[a_0]_i, \ldots, [a_{m-1}]_i$ obtained by dividing m electronic plain text values $a_0, \ldots, a_{m-1}$ by (k, n)-secret sharing in storages of the n inconsistency detecting devices $p_i$ which are connected to each other via a communications network, where an original plain text value based on a combination of the values $a_0, \ldots, a_{m-1}$ is only reconstructed when at least arbitrary k shares of the shares $[a_0]_i, \ldots, [a_{m-1}]_i$ are provided by the inconsistency detecting devices $p_i$, generating, by circuitry of the n inconsistency detecting devices $p_i$, random numbers $s_i$ and making the random numbers $s_i$ public;

generating, by circuitry of the n inconsistency detecting devices $p_i$ a common random number s which is a sum total of the random numbers $s_0, \ldots, s_{n-1}$;

calculating, by circuitry of the n inconsistency detecting devices $p_i$ shares $[c]_i = \sum_{j<m-1} s^{j+1} [a_j]_i + s^{m+1} [a_{m-1}]_i$ by using the common random number s and the shares $[a_0]_i, \ldots, [a_{m-1}]_i$;

generating, by circuitry of the n inconsistency detecting devices $p_i$ shares $[r]_i$, each of which becomes a random number r by reconstruction when reconstructed by (k, n)-secret sharing, wherein the random number r is concealed by any of the n inconsistency detecting devices $p_0, \ldots, p_{n-1}$;

calculating, by circuitry of the n inconsistency detecting devices $p_i$ shares $[d]_i = [c-r]_i$, each of which becomes a judgment value d by reconstruction when reconstructed by (k, n)-secret sharing, wherein the judgment value d indicates that there is no inconsistency in the shares $[a_0]_i, \ldots, [a_{m-1}]_i$;

receiving, by circuitry of one inconsistency detecting device $p_0$ n-1 shares $[d]_1, \ldots, [d]_{n-1}$ from circuitry of n-1 inconsistency detecting devices $p_1, \ldots, p_{n-1}$;

restoring, by circuitry of the inconsistency detecting device $p_0$ n−k shares $[d]'_k, \ldots, [d]'_{n-1}$ from k shares $[d]_0, \ldots, [d]_{k-1}$; and judging, by circuitry of the inconsistency detecting device $p_0$ for j=k, ..., n−1, whether or not the share $[d]_j$ and the share $[d]'_j$ coincide with each other, wherein the inconsistency detecting device is configured to detect an inconsistency by determining whether or not the shares $[a_0]_i, \ldots, [a_{m-1}]_i$ for i=0, ..., n are consistent while concealing the electronic plain text values $a_0, \ldots, a_{m-1}$ from all of the n inconsistency detecting devices by secret sharing.

2. The inconsistency detecting method according to claim 1, wherein j is assumed to be an integer greater than or equal to 0 but smaller than m, the inconsistency detecting method further includes:
dividing the shares $[a_0]_i, \ldots, [a_{m-1}]_i$ into a plurality of groups;
performing a processing which includes:
detecting a presence or absence of an inconsistency in each group; and
dividing a group on which a judgment that an inconsistency has occurred therein is made into a plurality of groups; and
repeating the processing until a number of shares included in a group becomes one to identify a share $[a_j]_i$ in which an inconsistency has occurred.

3. An inconsistency detecting system that includes n inconsistency detecting devices $p_0, \ldots, p_{n-1}$, wherein n and k are assumed to be integers that satisfy n≥2k−1, m is assumed to be an integer greater than or equal to 1, i is assumed to be each of integers greater than or equal to 0 but smaller than n, and i' is assumed to be each of integers that satisfy i≠i' and are greater than or equal to 0 but smaller than n, and each of the inconsistency detecting devices $p_i$ comprising:
circuitry configured to:
store shares $[a_0]_i, \ldots, [a_{m-1}]_i$ obtained by dividing m electronic plain text values $a_0, \ldots, a_{m-1}$ by (k, n)-secret sharing in a storage, the n inconsistency detecting devices being connected to each other via a communications network, where an original plain text value based on a combination of the values $a_0, \ldots, a_{m-1}$ is only reconstructed if at least arbitrary k shares of the shares $[a_0]_i, \ldots, [a_{m-1}]_i$ are provided by the inconsistency detecting devices $p_i$;
generate a random number $s_i$ and make the random number $s_i$ public;
generate a common random number s which is a sum total of the random numbers $s_0, \ldots, s_{n-1}$;
calculate a share $[c]_i = \Sigma_{j<m-1} s^{j+1}[a_j]_i + s^{m+1}[a_{m-1}]_i$ by using the common random number s and the shares $[a_0]_i, \ldots, [a_{m-1}]_i$;
generate a share $[r]_i$ which becomes a random number r when reconstructed by (k, n)-secret sharing, wherein the random number r is concealed by any of the n inconsistency detecting devices $p_0, \ldots, p_{n-1}$;
calculate a share $[d]_i = [c-r]_i$ which becomes a judgment value d when reconstructed by (k, n)-secret sharing, wherein the judgment value d indicates that there is no inconsistency in the shares $[a_0]_i, \ldots, [a_{m-1}]_i$;
receive n−1 shares $[d]_{i'}$ from other n−1 inconsistency detecting devices $p_i$;
restore n−k shares $[d]'_k, \ldots, [d]'_{n-1}$ from k shares $[d]_0, \ldots, [d]_{k-1}$; and judge, for j=k, ..., n−1, whether or not the share $[d]_j$ and the share $[d]'_j$ coincide with each other, wherein the inconsistency detecting device is configured to detect an inconsistency by determining whether or not the shares $[a_0]_i, \ldots, [a_{m-1}]_i$ for i=0, ..., n are consistent while concealing the electronic plain text values $a_0, \ldots, a_{m-1}$ from all of the n inconsistency detecting devices by secret sharing.

4. An inconsistency detecting device in an inconsistency detecting system that includes n inconsistency detecting devices, wherein n and k are assumed to be integers that satisfy n≥2k−1, m is assumed to be an integer greater than or equal to 1, i is assumed to be an integer greater than or equal to 0 but smaller than n, and i' is assumed to be each of integers that satisfy i≠i' and are greater than or equal to 0 but smaller than n, and the inconsistency detecting device comprising:
circuitry configured to:
store shares $[a_0]_i, \ldots, [a_{m-1}]_i$ obtained by dividing electronic plain text values $a_0, \ldots, a_{m-1}$ by (k, n)-secret sharing in a storage, the n inconsistency detecting devices being connected to each other via a communications network, where an original plain text value based on a combination of the values $a_0, \ldots, a_{m-1}$ is only reconstructed if at least arbitrary k shares of the shares $[a_0]_i, \ldots, [a_{m-1}]_i$ are provided by the inconsistency detecting devices $p_i$;
generate a random number $s_i$ and makes the random number $s_i$ public;
generate a common random number s which is a sum total of the random numbers $s_0, \ldots, s_{n-1}$;
calculate a share $[c]_i = \Sigma_{j<m-1} s^{j+1}[a_j]_i + s^{m+1}[a_{m-1}]_i$ by using the common random number s and the shares $[a_0]_i, \ldots, [a_{m-1}]_i$;
generate a share $[r]_i$ which becomes a random number r when reconstructed by (k, n)-secret sharing, wherein the random number r is concealed by any of the n inconsistency detecting devices $p_0, \ldots, p_{n-1}$;
calculate a share $[d]_i = [c-r]_i$ which becomes a judgment value d when reconstructed by (k, n)-secret sharing, wherein the judgment value d indicates that there is no inconsistency in the shares $[a_0]_i, \ldots, [a_{m-1}]_i$;
receive n−1 shares $[d]_{i'}$ from circuitry of other n−1 inconsistency detecting devices $p_i$;
restore n−k shares $[d]'_k, \ldots, [d]'_{n-1}$ from k shares $[d]_0, \ldots, [d]_{k-1}$; and
judge, for j=k, ..., n−1, whether or not the share $[d]_j$ and the share $[d]'_j$ coincide with each other,
wherein the inconsistency detecting device is configured to detect an inconsistency by determining whether or not the shares $[a_0]_i, \ldots, [a_{m-1}]_i$ for i=0, ..., n are consistent while concealing the electronic plain text values $a_0, \ldots, a_{m-1}$ from all of the n inconsistency detecting devices by secret sharing computation.

5. A non-transitory computer readable medium including computer executable instructions that make an inconsistency detecting device in an inconsistency detecting system that includes n inconsistency detecting devices, wherein n and k are assumed to be integers that satisfy n≥2k−1, m is assumed to be an integer greater than or equal to 1, i is assumed to be an integer greater than or equal to 0 but smaller than n, and i' is assumed to be each of integers that satisfy i≠i' and are greater than or equal to 0 but smaller than n, perform a method comprising:

storing shares $[a_0]_i, \ldots, [a_{m-1}]_i$ obtained by dividing m electronic plain text values $a_0, \ldots, a_{m-1}$ by (k, n)-secret sharing in a storage, the n inconsistency detecting devices being connected to each other via a communications network, where an original plain text value based on a combination of the values $a_0, \ldots, a_{m-1}$ is only reconstructed if at least arbitrary k shares of the shares $[a_0]_i, \ldots, [a_{m-1}]_i$ are provided by the inconsistency detecting devices $p_i$;

generating a random number $s_i$ and making the random number $s_i$ public;

generating a common random number s which is a sum total of the random numbers $s_0, \ldots, s_{n-1}$;

calculating a share $[c]_i = \Sigma_{j<m-1} s^{j+1}[a_j]_i + s^{m+1}[a_{m-1}]_i$ by using the common random number s and the shares $[a_0]_i, \ldots, [a_{m-1}]_i$;

generating a share $[r]_i$ which becomes a random number r when reconstructed by (k, n)-secret sharing, wherein the random number r is concealed by any of the n inconsistency detecting devices $p_0, \ldots, p_{n-1}$;

calculating a share $[d]_i = [c-r]_i$ which becomes a judgment value d when reconstructed by (k, n)-secret sharing, wherein the judgment value d indicates that there is no inconsistency in the shares $[a_0]_i, \ldots, [a_{m-1}]_i$;

receiving n−1 shares $[d]_{i'}$ from circuitry of other n−1 inconsistency detecting devices $p_{i'}$;

restoring n−k shares $[d]'_k, \ldots, [d]'_{n-1}$ from k shares $[d]_0, \ldots, [d]_{k-1}$; and judging, for j=k, \ldots, n−1, whether or not the share $[d]_j$ and the share $[d]'_j$ coincide with each other, wherein the inconsistency detecting device is configured to detect an inconsistency by determining whether or not the shares $[a_0]_i, \ldots, [a_{m-1}]_i$ for i=0, \ldots, n are consistent while concealing the electronic plain text values $a_0, \ldots, a_{m-1}$ from all of the n inconsistency detecting devices by secret sharing.

* * * * *